June 7, 1955 D. D. DE LOACH 2,710,228
FUEL·INJECTION APPARATUS FOR INTERNAL COMBUSTION ENGINES
Filed Oct. 13, 1952 2 Sheets-Sheet 1
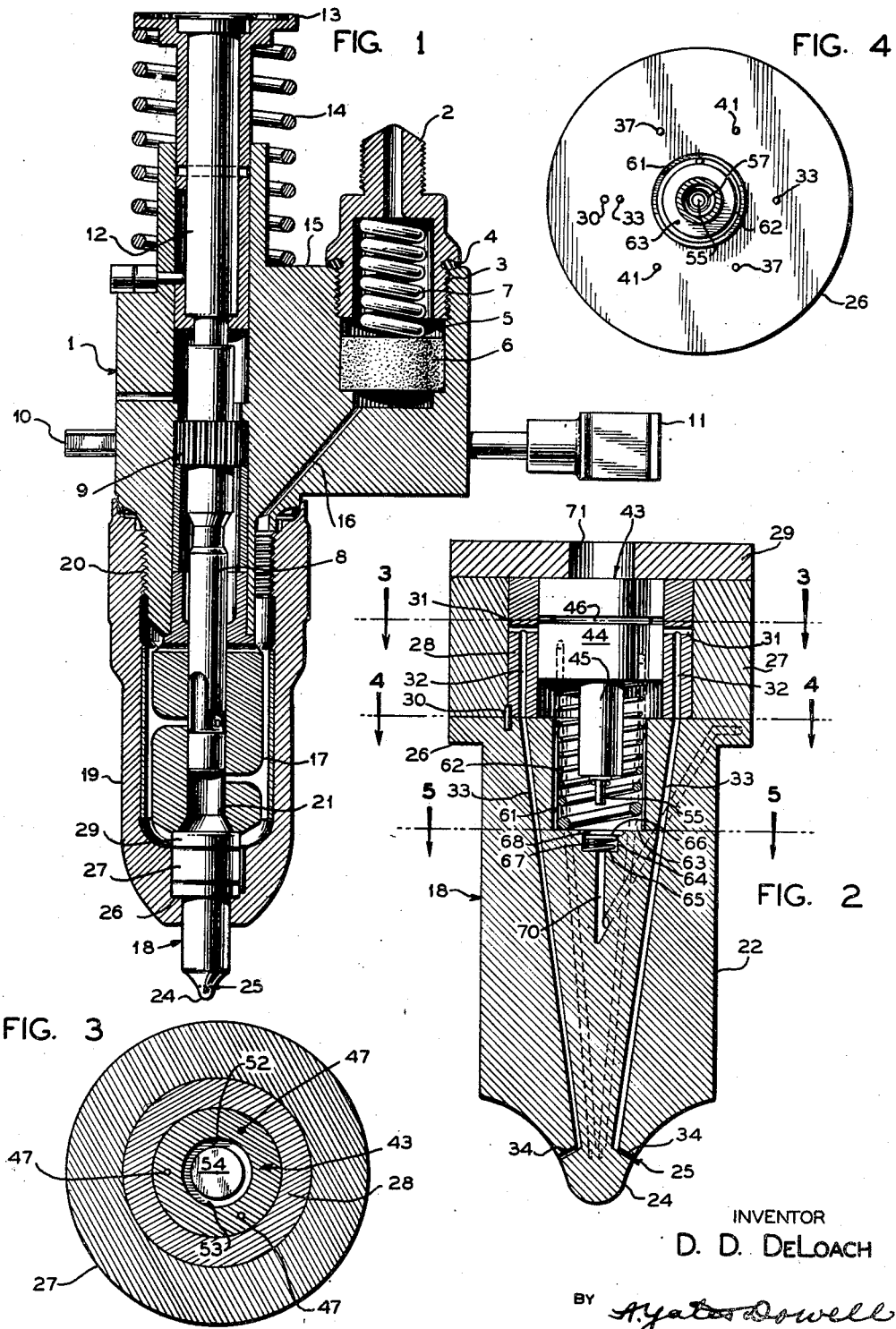
INVENTOR
D. D. DeLoach
BY A. Yates Dowell
ATTORNEY June 7, 1955        D. D. DE LOACH        2,710,228
FUEL INJECTION APPARATUS FOR INTERNAL COMBUSTION ENGINES
Filed Oct. 13, 1952        2 Sheets-Sheet 2
FIG. 7      FIG. 8      FIG. 9
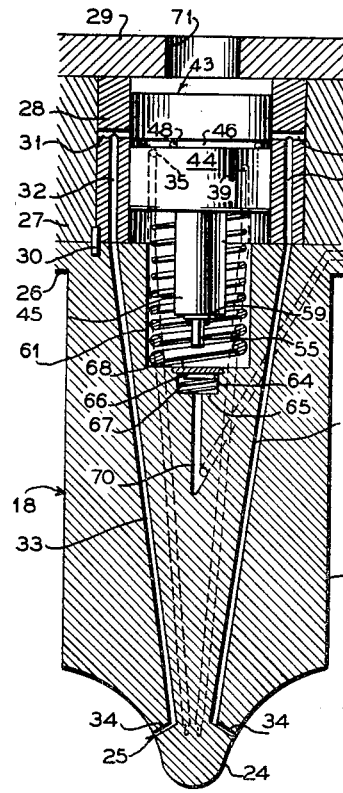
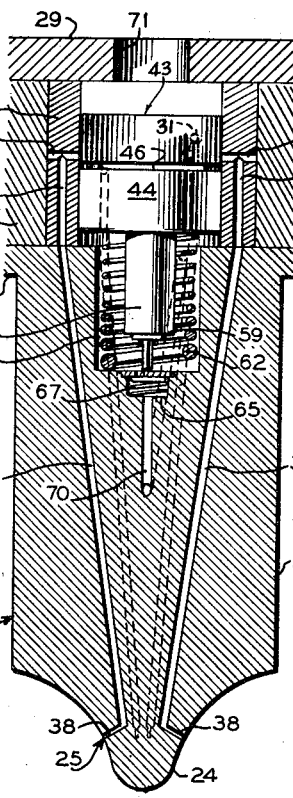
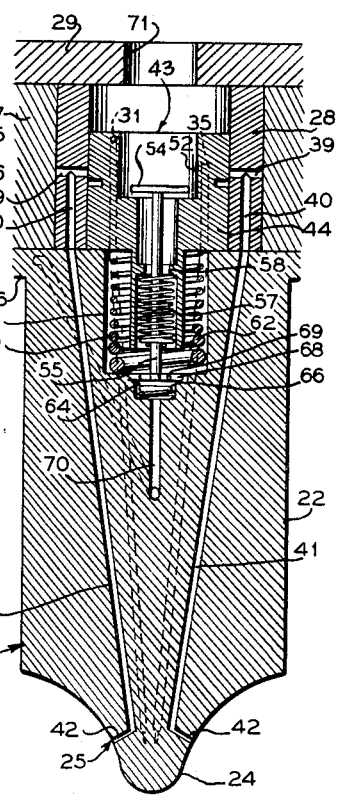
FIG. 10      FIG. 11      FIG. 12
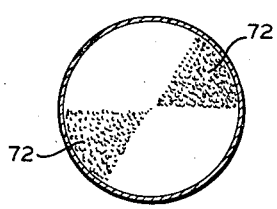
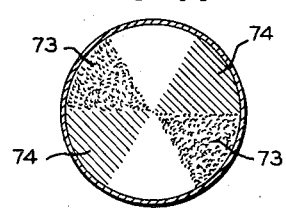
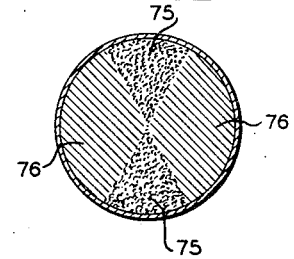
FIG. 5        FIG. 6
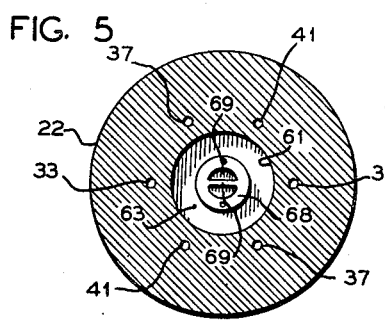
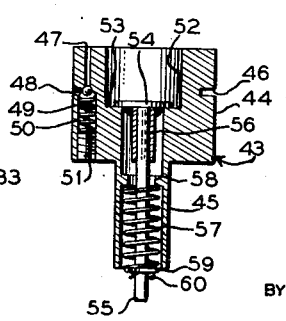
INVENTOR
D. D. DeLOACH
BY *H. Yates Dowell*
ATTORNEY

United States Patent Office 2,710,228
Patented June 7, 1955

2,710,228

FUEL INJECTION APPARATUS FOR INTERNAL COMBUSTION ENGINES

Douglas Dewey De Loach, Jacksonville, Fla.

Application October 13, 1952, Serial No. 314,433

18 Claims. (Cl. 299—107.5)

This invention relates to internal combustion engines and more particularly to a fuel injection apparatus for introducing fuel into the combustion chamber in a predetermined pattern in accordance with the load imposed on the engine.

It has been found that it is not only important that an accurately metered quantity of fuel be supplied to the combustion chamber of an engine in accordance with the load thereon but that it is equally important that this fuel be introduced and distributed uniformly over a given area in accordance with such load. It has further been found that by introducing fuel in such a manner that the flame front within the combustion chamber may be accurately controlled resulting in uniform burning of the combustible mixture throughout the cycle of operation and eliminating detonation toward the end of the power cycle due to nonuniform progress of the flame front.

Heretofore numerous attempts have been made to solve this problem and to accurately control the flame front presented within the combustion chamber but these prior attempts have only been moderately successful in that certain refinements therein are required in order to obtain the utmost efficiency from the engine thus increasing the power and reducing the fuel consumption. Furthermore, many of these prior art devices were not adapted to be utilized with conventional fuel injection apparatus but required special injectors which are rather complicated and costly to construct, not to mention the further problems of design and manufacture thereof.

Briefly stated, the apparatus of this invention comprises a fuel injection spray nozzle together with control means therefor, the entire assembly being interchangeable with the conventional nozzle now utilized with standard fuel injectors. Likewise the present invention includes in the spray nozzle automatic means for disposing of excess fuel supplied thereto and also for disposing of any fuel which may collect as a result of leakage by the valve utilized for controlling the distribution of fuel from such nozzle. This excess fuel is returned to the fuel reservoir of the conventional fuel injector.

The spray nozzle of this invention utilizes a plurality of spray orifices which operate in pairs and each pair of which is individually controlled by a piston valve to effect injection of fuel through pairs of orifices in succession. These orifices are distributed in such manner that the fuel is sprayed into the combustion chamber in a predetermined pattern depending upon the load imposed on the engine and resulting in substantially uniform burning of the combustible mixture and consequent uniform pressures on the head of the piston. As stated above, no redesign whatsoever of the conventional fuel injector is necessary, the special injection nozzle of this invention being interchangeable with the nozzle normally utilized in such conventional fuel injectors.

It is accordingly an object of this invention to provide a fuel injection nozzle for internal combustion engines which is completely interchangeable with the nozzle utilized in conventional fuel injectors without necessitating any re-design of such injectors.

It is a further object of the invention to provide a fuel injection nozzle for internal combustion engines in which means is incorporated for introducing fuel into the combustion chamber in such a manner that the flame front within the chamber is accurately controlled, resulting in substantially uniform progressive burning of the combustible mixture and uniform pressures distributed over the head of the piston.

A further object of the invention is the provision of a fuel injection nozzle for internal combustion engines in which the fuel is introduced into the combustion chamber in predetermined zones in accordance with the load imposed on the engine.

A still further object of the invention is the provision of a fuel injection nozzle for internal combustion engines in which means is provided for returning any fuel collecting by reason of leakage by the control apparatus and also returning fuel resulting from an excess supply thereof to a fuel reservoir in the injection apparatus.

Another object of the invention is the provision of a fuel injection nozzle for an internal combustion engine which requires a minimum number of moving parts thus resulting in relatively long life without necessitating frequent repairs thereon.

Further objects and advantages of the invention will be apparent from the following description taken in conjunction with the accompanying drawings, wherein:

Fig. 1 is a vertical sectional view showing a conventional fuel injection apparatus with the injection nozzle of this invention incorporated therein;

Fig. 2, a vertical sectional view to an enlarged scale of the fuel injection nozzle of this invention;

Fig. 3, a sectional view on the line 3—3 of Fig. 2;

Fig. 4, a sectional view on the line 4—4 of Fig. 2;

Fig. 5, a sectional view on the line 5—5 of Fig. 2;

Fig. 6, a sectional view showing the piston control valve incorporated in the injection nozzle of this invention, and likewise showing the structure of the excess fuel unloading valve;

Fig. 7, a sectional view similar to Fig. 2 and showing the position of the piston valve upon completion of the injection cycle under approximately one-third load;

Fig. 8, a sectional view similar to Fig. 7 and showing the position of the piston valve upon completion of the injection cycle under approximately two-thirds load;

Fig. 9, a sectional view similar to Fig. 7 and showing the position of the piston valve upon completion of the fuel injection cycle under approximately full load;

Fig. 10, a diagrammatic view showing the approximate area of the active flame front in the combustion chamber under approximately one-third load;

Fig. 11, a diagrammatic view similar to Fig. 10 and showing the approximate area of the active flame front and the area occupied by the burned gases resulting from previous injection of fuel under approximately two-thirds load; and, Fig. 12, a diagrammatic view similar to Fig. 10 and showing the approximate area of the active flame front and the area occupied by burned gases of previous injections under approximately full load.

With continued reference to the drawing, there is shown in Fig. 1 a fuel injector having a body 1 and a fuel inlet fitting 2 secured to the body by interengaging screw threads 3, leakage being prevented by a gasket 4. Mounted within a recess 5 in the body 1 is a fuel filter element 6 which is retained in position by a compression spring 7 bearing upon the upper surface of the filter element 6 and being held in place by the fuel inlet fitting 2.

Slidably and rotatably mounted within the body 1 is a plunger 8 upon which is mounted a pinion gear 9.

Plunger 8 is slidable within gear 9 but is fixed against rotation relative thereto. A slidable rack 10 is mounted in the body 1 transversely thereof and rack 10 engages pinion gear 9 to rotate the same in response to movement of the rack coupling member 11. Movement of the rack 10 and consequent rotation of the plunger 8 results in regulating the supply of fuel injected into the compression chamber.

A plunger follower 12 is slidably mounted within the body 1 in axial alignment with the plunger 8 and to the upper end of follower 12 is fixed a collar 13 which engages a compression spring 14 disposed between the collar 13 and the upper surface 15 of the body 1. A rocker arm, not shown, engages the follower 12 and moves the same downwardly against the action of spring 14 when it is desired to project the plunger 8 downwardly within the body 1.

Fuel supplied to the injector through the fuel inlet coupling 2 flows through the filter element 6 and through a passage 16 in the body 1 to a fuel reservoir 17, also located within the body 1.

A fuel injection nozzle indicated generally at 18 is secured to the body 1 of the injector by a hollow, elongated nut 19 which is attached to the body 1 of the injector by screw threads 20. Nut 19 serves to retain the injector 18 in axial alignment with a fuel supply passage 21 within the injector. The lower end of the nozzle 18 projects below the nut 19 and is disposed within the combustion space of the cylinder of the internal combustion engine with which the fuel injection apparatus of this invention is to be used.

As best shown in Fig. 2, the fuel injection nozzle 18 may well comprise an elongated body 22 terminating at its lower end in a reduced tip 24. A plurality of fuel injection orifices 25 are provided in the tip 24 and these orifices are disposed to project the fuel downwardly and outwardly away from the tip 24 in a generally conical pattern. A flange 26 is provided at the upper end of body 22 to engage the nut 19 and to facilitate the attachment of the fuel injection nozzle 18 to the body 1 of the injector apparatus. A ring 27 is positioned upon the upper surface of the flange 26 and within ring 27 is disposed a cylinder formed by a sleeve 28, the purpose of which will presently appear. Positioned upon the upper surface of the ring 27 and sleeve 28 is a spacer disc 29 which serves to accurately locate the injection nozzle 18 with relation to the body 1 of the injector. The inter-engaging surfaces between the flange 26, the ring 27, and sleeve 28, as well as between the ring 27, sleeve 28 and the lower surface of the spacer 29, are ground in order to provide a fluid tight engagement and also to preclude any inaccuracy in the location of the injection apparatus. The ring 27 and sleeve 28 are accurately located with respect to the body 22 of the injection nozzle 18 by a dowel pin 30 engaging these three parts.

Disposed within the sleeve 28 are diametrically opposed ports 31 opening through the inner surface of sleeve 28 into the cylinder formed thereby, ports 31 communicating through passages 32 in the sleeve 28 with passages 33 located in the body 22. Passages 33 communicate with spray orifices 34 disposed in the tip 24 and these orifices 34 serve to inject fuel into the combustion chamber of the internal combustion engine under one condition of load.

As shown in Fig. 8, a second diametrically opposed pair of ports 35 are disposed in the sleeve 28 and communicate with the interior thereof, ports 35 communicating through passages 36 disposed in sleeve 28 with passages 37 disposed in body 22, passages 37, in turn communicating with spray orifices 38 in the tip 24. Orifices 38 serve to deliver fuel to the combustion chamber of the internal combustion engine under a different load than that existing when such fuel is supplied through the orifices 34, above described.

As shown in Fig. 9, a third pair of diametrically opposed ports 39 are provided in the sleeve 28, such ports opening to the interior thereof and communicating through passages 40 disposed in sleeve 28 with passages 41 in the body 22, which in turn communicate with spray orifices 42 in the tip 24, orifices 42 serving to deliver fuel to the combustion chamber of the internal combustion engine under a still further condition of load from that obtaining when fuel is supplied through either the orifices 34 or the orifices 38 above described.

Slidably disposed within the sleeve 28 is a piston valve 43 having an enlarged body portion 44 and a reduced downwardly extending hollow portion 45. As best shown in Fig. 6, an annular groove 46 is provided in the external surface of the body portion 44 of the valve 43, and communicating with groove 46 are a series of passages 47 extending from the groove 46 to the upper surface of the body 44 of valve 43. As shown in Fig. 3 there are three passages 47 but any desired number of such passages may be employed. A check valve in the form of a ball 48 designed to seat against the lower edge of passage 47 within the annular groove 46 is biased toward closed position by a compression spring 49 disposed in a bore 50 in the body 44, compression spring 49 being retained in adjusted position by a screw threaded plug 51 also disposed in the bore 50. It will be understood that a check valve 48 is provided for each passage 47 and serves to prevent the backflow of fuel from groove 46 through the passage 47.

Disposed within the upper portion of the body 44 of valve 43 is a counterbore 52, the shoulder 53 at the lower end of this bore 52 serving as a seat for an excess pressure fuel unloading valve 54 having a stem 55 slidably received in a guide 56 and projecting through the hollow portion 45 of the valve 43. Disposed around the stem 55 of the valve 54 is a compression spring 57 which bears at its inner end against the shoulder 58 within the hollow portion 45, the lower end of spring 57 engaging a washer 59 retained on the stem 55 by a cotter key or the like 60. Spring 57 serves to normally maintain the valve 54 in engagement with the shoulder 53 thus preventing flow of fuel by the valve 54.

The piston valve 43 is slidably disposed within the sleeve 28 and the hollow portion 45 of valve 43 projects into a counterbore 61 in the body 22 of the injection nozzle 18, and also disposed within the counterbore 61 is a compression spring 62 which bears at its lower end against the shoulder 63 provided by the counterbore 61, the upper end of spring 62 engaging the lower surface of the body 44 of piston valve 43. Spring 62 may be calibrated in accordance with the injection pressure of the fuel utilized and normally serves to urge the piston valve 43 upwardly to the position shown in Fig. 2. In this position the upper surface of the body 44 of piston valve 43 is in contact with the lower surface of spaces 29 and since these surfaces are ground to provide a fluid tight engagement any flow of fuel to the passages 47 will be prevented until the piston valve 43 moves downwardly as the fuel pressure builds up to overcome the force of calibrated spring 62. By this expedient any premature injection of fuel is avoided.

A second counter bore 64 is provided in the body 22 of the spray nozzle 18, this counterbore being concentric with the counterbore 61. Bore 64 terminates in a shoulder 65 and disposed within the bore is a check valve 66 and a compression spring 67 abutting the shoulder 65 and the lower surface of check valve 66. A valve seat 68 in the form of a disc threadedly received in the bore 64 is provided with apertures 69 which permit passage of fuel therethrough when the valve 66 is open. In its closed position valve 66 engages the lower surface of seat 68. Communicating with the bore 64 is a passage 70 which in turn communicates with the fuel reservoir 17 in the injection apparatus and permits the return of fuel thereto in a manner presently to be described. Fuel is supplied to the injection nozzle 18 through the passage 21 and an aperture 71 in the spacer disc 29, and the operation of the device will now be described.

Fuel is supplied through the aperture 71 and spacer disc 29 at a predetermined pressure in accordance with the load on the engine and such fuel exerts a pressure against the upper surface of the piston valve 43 and forces the same downwardly against the action of calibrated spring 62. The downward movement of valve 43 will be controlled by such calibrated spring 62 and for approximately one-third load on the engine will move downwardly until the annular groove 46 is in communication with the diametrically opposite ports 31 and as the load increases will move slightly therebeyond as shown in Fig. 7. Upon communication being established between annular groove 46 and ports 31, fuel will flow from the aperture 71 through the passages 47 and by check valves 48 into the annular groove 46 and thus into the ports 31. Thereupon the fuel will flow downwardly through passages 32 and 33 to the discharge orifices 34. This results in fuel being sprayed into the combustion chamber in the areas 72 as shown in Fig. 10. As the load increases and piston valve 43 moves downwardly to the position shown in Fig. 7, the annular groove 46 moves out of communication with the ports 31 and thus cuts off the spray orifices 34.

As the load continues to increase, the fuel in the area 72 in the combustion chamber burns and the valve 43 moves downwardly to bring the annular groove 46 into communication with the ports 35, which through the passages 36 and 37 supplies fuel to the spray orifices 38 which results in injecting fuel to the areas 73 as shown in Fig. 11. The cross hatched portions 74 in this figure represent the burned gases resulting from the introduction of fuel into the areas 72 as above described. As the load increases, the valve 43 moves to the position shown in Fig. 8, thus cutting off the supply of fuel to the spray orifices 38. At this point the engine is operating under approximately two/thirds load.

A still further increase in load on the engine will result in the fuel pressure exerted on the piston 43 increasing, thus moving the piston downwardly until the annular groove 46 communicates with the ports 39, thus supplying fuel through passages 40 and 41 to spray orifices 42 which inject fuel into the combustion chamber in the areas 75 as shown in Fig. 12. The cross hatched area 76 in Fig. 12 represent the burned gases resulting from the injection of fuel through the orifices 34 to the area 72 as shown in Figs. 7 and 10 and through the orifices 38 to the areas 74, as shown in Figs. 8 and 11. Continued downward movement of the piston valve 43 results in cutting off the supply of fuel to the spray orifices 42 and as shown in Fig. 9 at this point where the engine is operating under substantially full load the lower end of valve stem 55 will contact the upper surface of valve seat 68, thus moving the valve stem 55 and valve 54 carried thereby upwardly to open the valve 54 and permit the flow of fuel from the aperture 71 around the valve 54 and through the passage 70 to be returned to the fuel reservoir 17 in the injection apparatus. This condition only obtains when the fuel pressure is excessive which results in moving the piston valve 43 downwardly beyond its normal course of movement and is intended to relieve excess pressure on the device. At this same time any fuel which may have leaked by the piston valve 43 also is discharged through return passage 70 as a result of the opening of check valve 66. Upon release of pressure above the check valve 66 such valve will close to prevent return flow of fuel through the passage 70.

As the load on the engine varies the piston valve 43 will move up or downwardly within the sleeve 28 in response to changes in pressure of the fuel being injected and consequently such fuel will be supplied to the combustion chamber through an appropriate pair of spray orifices in the tip 24, thus resulting in proper distribution of the fuel in the combustion chamber and control of the flame front therein in order to prevent undesired detonation which would result in a decrease in efficiency of the engine. The excess pressure on unloading valve 54 and the check valve 66 which permits return of excess fuel resulting from excess pressure and the return of fuel leaking by the piston valve 43 to the reservoir in the injection apparatus is an extremely important part of the invention and results in more precise operation thereof and far better control of the combustion conditions within the combustion chamber than would be possible were these features not provided. The relief of excess pressures not only reduces leakage but also reduces strain on the apparatus due to such excess pressures which would tend to initiate leaks and enlarge any leaks which might develop.

While the improved fuel injection nozzle of this invention has been shown in connection with one type of injection apparatus, it is to be understood that this is for illustrative purposes only and that the injection nozzle of this invention may likewise be incorporated in injection apparatus of other design since the basic features of the invention are in no way affected by the design of such injection apparatus.

It will thus be seen that by this invention there has been provided a fuel injection nozzle which will automatically supply fuel to a combustion chamber in accordance with the load on the engine which results in accurate control of the flame front in the combustion chamber, thus resulting in eliminating detonation and consequent lowering of efficiency of the engine.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. For use with a fuel injection apparatus for an internal combustion engine having means for supplying fuel at a predetermined pressure in accordance with the load on the engine, an injection nozzle comprising an elongated body having a reduced portion at one end providing a tip, a ring seated on the opposite end of said body and a sleeve within said ring providing a cylinder, a spacer disc seated on the opposite end of said ring and sleeve, and an aperture in said disc providing a fuel inlet opening to said cylinder, a piston valve slidably disposed in said cylinder, said valve comprising an elongated valve body and a reduced hollow extension depending therefrom, a bore in said valve body terminating in a shoulder providing a valve seat, a poppet valve in said bore and a valve stem extending therefrom and slidably received in said hollow extension, a compression spring disposed in said hollow extension about said stem and biasing said poppet valve into engagement with said seat, an annular groove in the outer surface of said piston valve, a plurality of fuel supply passages in said piston valve communicating with said groove and with the upper surface of said piston valve, a check valve in each fuel supply passage, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a calibrated spring engaging said last named shoulder and said piston valve to urge said piston valve toward one end of said cylinder, a second counterbore in said elongated body communicating with said first counterbore and a fuel return passage, a spring loaded check valve disposed in said second counterbore and a removable valve seat for retaining said last named check valve in said second counterbore, said valve seat having apertures to permit the flow of fuel therethrough to said return passage upon opening of said last named check valve whereby upon movement of said piston valve inwardly of said cylinder by the fuel under pressure in accordance with the load on the engine and against the action of said calibrated spring said pairs of ports will progressively register with said groove as the load on the engine increases to selectively inject fuel into the combustion chamber through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

2. For use with a fuel injection apparatus for an internal combustion engine having means for supplying fuel at a predetermined pressure in accordance with the load on the engine, an injection nozzle comprising an elongated body having a reduced portion at one end providing a tip, a ring seated on the opposite end of said body and a sleeve within said ring providing a cylinder, a spacer disc seated on the opposite end of said ring and sleeve and an aperture in said disc providing a fuel inlet opening to said cylinder, a piston valve slidably disposed in said cylinder, said valve comprising an enlarged valve body and a reduced hollow extension depending therefrom, a bore in said valve body terminating in a shoulder providing a valve seat, a poppet valve in said bore and a valve stem extending therefrom slidably received in said hollow extension, a compression spring disposed in said hollow extension about said stem and biasing said poppet valve into engagement with said seat, an annular groove in the outer surface of said piston valve, a fuel supply passage in said piston valve communicating with said groove and with the upper surface of said piston valve, a check valve in said fuel supply passage, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a calibrated spring engaging said last named shoulder and said piston valve to urge said piston valve toward one end of said cylinder, a second counterbore in said elongated body communicating with said first counterbore and a fuel return passage, a spring loaded check valve disposed in said second counterbore and a removable valve seat for retaining said last named check valve in said second counterbore, said valve seat having apertures to permit the flow of fuel therethrough to said return passage upon opening of said last named check valve whereby upon movement of said piston valve inwardly of said cylinder by the fuel under pressure in accordance with the load on the engine and against the action of said calibrated spring said pairs of ports will progressively register with said groove as the load on the engine increases to selectively inject fuel into the combustion chamber through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

3. For use with a fuel injection apparatus for an internal combustion engine having means for supplying fuel at a predetermined pressure in accordance with the load on the engine, an injection nozzle comprising an elongated body having a reduced portion at one end providing a tip, a ring seated on the opposite end of said body and a sleeve within said ring providing a cylinder, a spacer disc seated on the opposite end of said ring and sleeve and an aperture in said disc providing a fuel inlet opening to said cylinder, a piston valve slidably disposed in said cylinder, said valve comprising an enlarged valve body and a reduced hollow extension depending therefrom, a bore in said valve body terminating in a shoulder providing a valve seat, a poppet valve in said bore and a valve stem extending therefrom slidably received in said hollow extension, a compression spring disposed in said hollw extension about said stem and biasing said poppet valve into engagement with said seat, an annular groove in the outer surface of said piston valve, a fuel supply passage in said piston valve communicating with said groove and with the upper surface of said piston valve, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a calibrated spring engaging said last named shoulder and said piston valve to urge said piston valve toward one end of said cylinder, a second counterbore in said elongated body communicating with said first counterbore and a fuel return passage, a spring loaded check valve disposed in said second counterbore and a removable valve seat retaining said last named check valve in said second counterbore, said valve seat having apertures to permit the flow of fuel therethrough to said return passage upon opening of said last named check valve whereby upon movement of said piston valve inwardly of said cylinder by the fuel under pressure in accordance with the load on the engine and against the action of said calibrated spring said pairs of ports will progressively register with said groove as the load on the engine increases to selectively inject fuel into the combustion chamber through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

4. For use with a fuel injection apparatus for an internal combustion engine having means for supplying fuel at a predetermined pressure in accordance with the load on the engine, an injection nozzle comprising an elongated body having a reduced portion at one end providing a tip, a ring seated on the opposite end of said body and a sleeve within said ring providing a cylinder, a spacer disc seated on the opposite end of said ring and sleeve and an aperture in said disc providing a fuel inlet opening to said cylinder, a piston valve slidably disposed within said cylinder, said valve comprising a valve body and a hollow extension depending therefrom, a bore in said valve body terminating in a shoulder providing a valve seat, a poppet valve in said bore and a valve stem extending therefrom slidably received in said hollow extension, a compression spring disposed in said hollow extension about said stem and biasing said poppet valve into engagement with said seat, an annular groove in the outer surface of said piston valve, a fuel supply passage in said piston valve communicating with said groove and with the upper surface of said piston valve, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a calibrated spring engaging said last named shoulder and said piston valve to urge said piston valve toward one end of said cylinder, a second counterbore in said elongated body communicating with said first counterbore and a fuel return passage, a spring loaded check valve disposed in said second counterbore and a removable valve seat for retaining last named check valve in said second counterbore, said valve seat having apertures to permit the flow of fuel therethrough to said return passage upon opening of said last named check valve whereby upon movement of said piston valve inwardly of said cylinder by the fuel under pressure in accordance with the load on the engine and against the action of said calibrated spring said pairs of ports will progressively register with said groove as the load on the engine increases to selectively inject fuel into the combustion chamber through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by piston valve also being discharged through said last named check valve and said return passage.

5. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a spacer disc seated on the opposite end of said sleeve and an aperture in said disc providing a fuel inlet opening to said cylinder, a piston valve slidably disposed in said cylinder, said valve comprising a valve body and a hollow extension depending therefrom, a bore in said valve body terminating in a shoulder providing a valve seat, a poppet valve in said bore and a valve stem extending therefrom slidably received in said hollow extension, a compression spring disposed in said hollow extension about said stem and biasing said poppet valve into engagement with said seat, an annular groove in the outer surface of said piston valve, a fuel supply passage in said piston valve communicating with said groove and with the upper surface of said piston valve, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a calibrated spring engaging said last named shoulder and said piston valve to urge said piston valve toward one end of said cylinder, a second counterbore in said elongated body communicating with said first counterbore and a fuel return passage, a spring loaded check valve disposed in said second counterbore and a removable valve seat for retaining said last named check valve in said second counterbore, said valve seat having apertures to permit the flow of fuel therethrough to said return passage upon opening of said last named check valve whereby upon movement of said piston valve inwardly of said cylinder by the fuel under pressure in accordance with the load on the engine and against the action of said calibrated spring said pairs of ports will progressively register with said groove as the load on the engine increases to selectively inject fuel into the combustion chamber through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

6. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a fuel inlet to said cylinder, a piston valve slidably disposed in said cylinder, said valve comprising a valve body and a hollow extension depending therefrom, a bore in said valve body terminating in a shoulder providing a valve seat, a poppet valve in said bore and a valve stem extending therefrom slidably received in said hollow extension, a compression spring disposed in said hollow extension and biasing said poppet valve into engagement with said seat, an annular groove in the outer surface of said piston valve, a fuel supply passage in said piston valve communicating with said groove and with the upper surface of said piston valve, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a calibrated spring engaging said last named shoulder and said piston valve to urge said piston valve toward one end of said cylinder, a second counterbore in said elongated body communicating with said first counterbore and a fuel return passage, a spring loaded check valve disposed in said second counterbore and a removable valve seat for retaining said last named check valve in said second counterbore, said valve seat having apertures to permit the flow of fuel therethrough to said return passage upon opening of said last named check valve whereby upon movement of said piston inwardly of said cylinder by the fuel under pressure in accordance with the load on the engine and against the action of said calibrated spring said pairs of ports will progressively register with said groove as the load on the engine increases to selectively inject fuel into the combustion chamber through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

7. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opopsite end of said body providing a cylinder, a fuel inlet to said cylinder, a piston valve slidably disposed in said cylinder, said valve comprising a valve body and a hollow extension depending therefrom, a bore in said valve body terminating in a shoulder providing a valve seat, a poppet valve in said bore and a valve stem extending therefrom slidably received in said hollow extension, means for biasing said poppet valve into engagement with said seat, an annular groove in the outer surface of said piston valve, a fuel supply passage in said piston valve communicating with said groove and with said cylinder, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a calibrated spring engaging said last named shoulder and said piston valve to urge said piston valve toward one end of said cylinder, a second counterbore in said elongated body communicating with said first counterbore and a fuel return passage, a spring loaded check valve disposed in said second counterbore and a removable valve seat for retaining said last named check valve in said second counterbore, said valve seat having apertures to permit the flow of fuel therethrough to said return passage upon opening of said last named check valve whereby upon movement of said piston valve inwardly of said cylinder by the fuel under pressure in accordance with the load on the engine and against the action of said calibrated spring said pairs of ports will progressively register with said groove as the load on the engine increases to selectively inject fuel through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit discharge of fuel through said last named check valve and said return passage to relieve the excess pressure, any fuel leaking by said piston valve also being discharged through said last named check valve and said return passage.

8. A fuel injection nozzle comprising a body having a tip with a plurality of radially extending discharge orifices, said body including a cylindrical bore and a plurality of passages extending from said radially extending orifices to the walls defining said cylindrical bore, a piston reciprocally mounted in said bore and resilient means urging said piston away from said tip, said passages being in communication with the interior periphery of said cylindrical bore by means of inlets, said piston having passage means for communication with said passage inlets and said piston being movable by the resilient means to its extreme position preventing communication of the cylinder chamber with said passages, said piston and said cylinder wall being provided with co-operating grooves for registry with said inlet passages whereby the passage means and said piston will communicate with the passages in said body, said passage inlets for oppositely disposed radial orifices being in approximately the same transverse plane with respect to the axis of said piston and each opposed pair of orifices being in communication with passage inlets at different axially spaced positions on said cylinder whereby fuel may be fed to an internal combustion engine in different sectors of the engine cylinders producing combustion in arcuately spaced sectors progressively thereby avoiding detonation.

9. The invention according to claim 8 in which a valve is provided in said piston preventing communication between the side of such piston adjacent said orifices and the side of said piston away from said orifices and means to open said valve in said piston when the cooperating groove of said piston has moved beyond the last set of passage inlets and means to return fuel from the side of said piston adjacent said orifices to the supply.

10. A fuel injection nozzle for a high pressure internal combusion engine comprising a body having a slide valve mounted for reciprocation therein, said body being provided with a nozzle having a plurality of discharge orifices, said slide valve and said body having registerable passages for conducting fuel to selected discharge orifices only and preventing communication to other orifices, means responsive to the pressure on said slide valve for moving said slide valve thereby providing communication between certain of said orifices only and the supply of fuel and means for preventing fuel supply to said certain orifices only and to supply fuel to other of said orifices only whereby the combustion in the internal combustion cylinder will take place in selected regions only of the said internal combustion engine, a relief valve mounted in said slide valve and biased to seating position by the pressure on the slide valve, said relief valve having a stem projecting from said relief valve, and means on said body for engaging the stem of said valve to cause said relief valve to open after fuel has been supplied to the last of said other of said orifices to prevent excessive pressure in said body.

11. A fuel injection nozzle comprising a cylinder having a plurality of openings extending therefrom in axially spaced relation, a piston slidably mounted in said cylinder and having a passage extending from one end thereof toward an intermediate location on the periphery of the piston for registry with the openings in the cylinder wall for providing communication between said one end of the piston and the axially spaced openings, outlet orifices formed in said nozzle and communicating passages extending from said openings to said orifices, each axially spaced opening in said cylinder communicating with certain ones only of said orifices whereby fuel is injected successively through said orifices, the orifices in communication with one location of openings directing fuel to limited sectors only of an internal combustion cylinder and others of said openings being in communication only with other orifices for directing fuel to other sectors only in the cylinder of an internal combustion engine whereby the fuel is fed to comparatively uncontaminated air thereby reducing detonation, a relief valve mounted in said piston and spring biased to seating position, said relief valve having an operating stem projecting therefrom, and means on said body for engaging the operating stem of said relief valve to cause said relief valve to open after fuel has been supplied to the last of said other orifices to prevent rupturing pressures in said body.

12. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a fuel inlet to said cylinder, a piston valve slidably disposed in said cylinder, a bore in said valve, a poppet valve in said bore and a valve stem extending therefrom, an annular groove in the outer surface of said piston valve, a fuel supply passage in said piston valve communicating with said groove and said cylinder, a plurality of pairs of diametrically opposed ports in said sleeve communicating with said cylinder, said pairs of ports being spaced axially of said cylinder, pairs of passages in said sleeve and said elongated body communicating with each pair of ports and with diametrically disposed pairs of spray orifices in said tip, a counterbore in said elongated body terminating in a shoulder, a spring engaging said last named shoulder and said piston valve to urge said piston valve toward one end of said cylinder, a second counterbore in said elongated body communicating with said first counterbore and a fuel return passage, a check valve disposed in said second counterbore and a removable seat for retaining said last named check valve in said second counterbore, said valve seat having apertures to permit the flow of fuel therethrough to said return passage upon opening of said last named check valve whereby upon movement of said piston valve inwardly of said cylinder by the fuel under pressure in accordance with the load on the engine and against the action of said spring said pairs of ports will progressively register with said groove as the load on the engine increases to selectively inject fuel into the combustion chamber through said pairs of orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

13. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a fuel inlet to said cylinder, a piston valve slidably disposed in said cylinder, a bore in said valve, a poppet valve in said bore and a valve stem extending therefrom, an annular groove in the outer surface of said piston valve, a fuel supply passage in said piston valve communicating with said groove and with said cylinder, a plurality of ports in said sleeve communicating with said cylinder, said ports being spaced axially of said cylinder, passages in said sleeve and said elongated body communicating with each port and with spray orifices in said tip, a counterbore in said elongated body terminating in a shoulder, a spring engaging said last named shoulder and said piston valve to urge said piston valve toward one end of said cylinder, a second counterbore in said elongated body communicating with said first counterbore and a fuel return passage, a check valve disposed in said second counterbore and a removable seat for retaining said last named check valve in said second counterbore, said valve seat having apertures to permit the flow of fuel therethrough to said return passage upon opening of said last named check valve whereby upon movement of said piston inwardly of said cylinder by the fuel under pressure in accordance with the load on the engine and against the action of said spring, said ports will progressively register with said groove as the load on the engine increases to selectively inject fuel into the combustion chamber through said orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

14. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a fuel inlet to said cylinder, a piston valve slidably disposed in said cylinder, a bore in said valve, a poppet valve in said bore and a valve stem extending therefrom, an annular groove in the outer surface of said piston valve, a fuel supply passage in said piston valve communicating with said groove and with said cylinder, a plurality of ports in said sleeve communicating with said cylinder, said ports being spaced axially of said cylinder, passages in said sleeve and said elongated body communicating with each port and with spray orifices in said tip, a counterbore in said elongated body communicating with said cylinder and a fuel return passage, a check valve disposed in said counterbore and a removable valve seat for retaining said last named check valve in said counterbore, said valve seat having apertures to permit the flow of fuel therethrough to said return passage upon opening of said last named check valve whereby upon movement of said piston valve inwardly of said cylinder by the fuel under pressure in accordance with the load on the engine said ports will progressively register with said groove as the load on the engine increases to selectively inject fuel into the combustion chamber through said orifices thus controlling distribution of fuel and the flame front in the combustion chamber, further inward movement of said piston valve under the action of excess fuel pressure resulting in contact of said valve stem with said last named seat thereby opening said poppet valve to permit the discharge of fuel through said last named check valve and said return passage to relieve the excess pressure, any fuel leaking by said piston valve also being discharged through said last named check valve and said return passage.

15. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a fuel inlet to said cylinder, a piston valve slidably disposed in said cylinder, a bore in said valve, a poppet valve in said bore and a valve stem extending therefrom, an annular groove in the outer surface of said piston valve, a fuel supply passage in said piston valve communicating with said groove and with said cylinder, a plurality of ports in said sleeve communicating with said cylinder, said ports being spaced axially of said cylinder, passages in said sleeve and said elongated body communicating with each port and with spray orifices in said tip, a counterbore in said elongated body communicating with said cylinder and a fuel return passage, a check valve disposed in said counterbore whereby upon movement of said piston valve inwardly of said cylinder by the fuel under pressure in accordance with the load on the engine said ports will progressively register with said groove as the load on the engine increases to selectively inject fuel into the combustion chamber through said orifices thus controlling distribution of fuel and the flame front in the combustion chamber, further inward movement of said piston valve under the action of excess fuel pressure resulting in contact of said stem with a portion of said elongated body thereby opening said poppet valve to permit the discharge of fuel through said last named check valve and said return passage to relieve the excess pressure, any fuel leaking by said piston valve also being discharged through said last named check valve and said return passage.

16. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a fuel inlet to said cylinder, a piston valve slidably disposed in said cylinder, a bore in said valve, a poppet valve in said bore and a valve stem extending therefrom, an annular groove in the outer surface of said piston valve, a fuel supply passage in said piston valve communicating with said groove and with said cylinder, a plurality of ports in said sleeve communicating with said cylinder, said ports being spaced axially of said cylinder, passages in said sleeve and said elongated body communicating with each port and with spray orifices in said tip, a counterbore in said elongated body communicating with said cylinder and a fuel return passage whereby upon movement of said piston valve inwardly of said cylinder by the fuel under pressure in accordance with the load on the engine said ports will progressively register with said groove as the load on the engine increases to selectively inject fuel into the combustion chamber through said orifices thus controlling distribution of fuel and the flame front in the combustion chamber, further inward movement of said piston valve under the action of excess fuel pressure resulting in contact of said valve stem with a portion of said elongated body thereby opening said poppet valve to permit the discharge of fuel through said return passage to relieve the excess pressure, any fuel leaking by said piston valve also being discharged through said return passage.

17. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on the opposite end of said body providing a cylinder, a fuel inlet to said cylinder, a piston valve slidably disposed in said cylinder, a bore in said valve, a poppet valve in said bore, means to open said poppet valve upon movement of said piston valve to one extreme position, an annular groove in the outer surface of said piston valve, a fuel supply passage in said piston valve communicating with said groove and with said cylinder, a plurality of ports in said sleeve communicating with said cylinder, said ports being spaced axially of said cylinder, passages in said sleeve and said elongated body communicating with each port and with spray orifices in said tip, a counterbore in said elongated body communicating with said cylinder and a fuel return passage whereby upon movement of said piston valve inwardly of said cylinder by the fuel under pressure in accordance with the load on the engine said ports will progressively register with said groove as the load on the engine increases to selectively inject fuel into the combustion chamber through said orifices thus controlling distribution of fuel and the flame front in the combustion chamber, further inward movement of said piston valve under the action of excess fuel pressure resulting in opening of said poppet valve to permit the discharge of fuel through said return passage to relieve the excess pressure, any fuel leaking by said piston valve also being discharged through said return passage.

18. For use with a fuel injection apparatus for an internal combustion engine having means for supplying fuel at a predetermined pressure in accordance with the load on the engine, an injection nozzle comprising an elongated body having a reduced portion at one end providing a tip, a sleeve seated on one end of said body providing a cylinder, a fuel inlet to said cylinder, a piston valve slidably disposed in said cylinder, a bore in said valve, a poppet valve in said bore, means to open said poppet valve upon movement of said piston valve to one extreme position, an annular groove in the outer surface of said piston valve, a fuel supply passage in said piston valve communicating with said groove and with said cylinder, a plurality of ports in said sleeve communicating with said cylinder, said ports being spaced axially of said cylinder, passages in said sleeve and said elongated body communicating with each port and with spray orifices in said tip, a counterbore in said elongated body communicating with said cylinder and a fuel return passage whereby upon movement of said piston valve inwardly of said cylinder by the fuel under pressure in accordance with the load in the engine said ports will progressively register with said groove as the load on the engine increases to selectively inject fuel into the combustion chamber through said orifices thus controlling distribution of fuel and the flame front in the combustion chamber, further inward movement of said piston valve under the action of excess fuel pressure resulting in opening said poppet valve to permit the discharge of fuel through said return passage to relieve the excess pressure.

References Cited in the file of this patent

UNITED STATES PATENTS

| Number | Name | Date |
|---|---|---|
| 1,833,080 | Kenworthy | Nov. 24, 1931 |
| 2,003,814 | Taylor | June 4, 1935 |
| 2,063,709 | Taylor | Dec. 8, 1936 |
| 2,295,081 | Harvath | Sept. 8, 1942 |
| 2,521,224 | Kammer | Sept. 5, 1950 |

FOREIGN PATENTS

| Number | Country | Date |
|---|---|---|
| 549,419 | Great Britain | Nov. 20, 1942 |
| 977,818 | France | Apr. 5, 1951 |